(12) United States Patent
Vasantham et al.

(10) Patent No.: US 9,916,560 B2
(45) Date of Patent: Mar. 13, 2018

(54) INVENTORY TRACKING

(71) Applicant: Wal-Mart Stores, Inc., Bentonville, AR (US)

(72) Inventors: Madhavan Kandhadai Vasantham, Foster City, CA (US); Vikrant Tare, Foster City, CA (US); Manish Gupta, Foster City, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 806 days.

(21) Appl. No.: 13/931,728

(22) Filed: Jun. 28, 2013

(65) Prior Publication Data

US 2015/0006335 A1    Jan. 1, 2015

(51) Int. Cl.
*G06Q 10/00* (2012.01)
*G06Q 10/08* (2012.01)
*G06Q 20/20* (2012.01)

(52) U.S. Cl.
CPC ......... *G06Q 10/087* (2013.01); *G06Q 20/203* (2013.01)

(58) Field of Classification Search
USPC .................................................... 705/28, 22
See application file for complete search history.

(56) References Cited

U.S. PATENT DOCUMENTS

| | | | |
|---|---|---|---|
| 4,425,616 A | 1/1984 | Woodell | |
| 5,706,976 A | 1/1998 | Purkey | |
| 6,601,764 B1 | 8/2003 | Goodwin, III | |
| 6,816,074 B2 | 11/2004 | Wong | |
| 6,829,520 B1 * | 12/2004 | Green | G01K 3/04 235/385 |
| 7,118,036 B1 * | 10/2006 | Couch | G06Q 10/087 235/383 |
| 7,233,241 B2 | 6/2007 | Overhultz | |
| 7,828,211 B2 | 11/2010 | Landers, Jr. | |
| 7,848,881 B2 | 12/2010 | Tan | |
| 8,024,236 B2 | 9/2011 | Vitulli | |
| 8,296,375 B1 | 10/2012 | Katzer | |
| 8,321,303 B1 | 11/2012 | Krishnamurthy | |
| 8,401,911 B1 * | 3/2013 | Chu | G06Q 10/087 705/14.51 |
| 8,478,648 B2 | 7/2013 | Smires | |
| 8,630,443 B2 | 1/2014 | Tan | |
| 2003/0033205 A1 * | 2/2003 | Nowers | G06Q 30/06 705/26.2 |
| 2003/0139982 A1 | 7/2003 | Schwartz | |
| 2004/0243487 A1 | 12/2004 | Tien | |

(Continued)

FOREIGN PATENT DOCUMENTS

WO    WO1999006920    2/1999
WO    WO2004017156 A3    4/2005

*Primary Examiner* — Ryan Zeender
*Assistant Examiner* — Christopher Buchanan
(74) *Attorney, Agent, or Firm* — Bryan Cave LLP

(57) ABSTRACT

The present disclosure extends to maintaining an item inventory status at an inventory cache management system. The inventory cache may be refreshed regularly by a threshold-based triggering mechanism. In embodiments, as item inventory breaches certain thresholds, the inventory cache may be refreshed with increased frequency to mitigate overselling or underselling scenarios and reduce overall network traffic for items having relatively high inventory levels.

23 Claims, 5 Drawing Sheets

(56) References Cited

U.S. PATENT DOCUMENTS

| | | |
|---|---|---|
| 2005/0137944 A1 | 6/2005 | Lu |
| 2006/0026011 A1* | 2/2006 | Verego .................. G06Q 30/02 705/7.11 |
| 2006/0095434 A1 | 5/2006 | McCullough et al. |
| 2008/0071626 A1* | 3/2008 | Hill ....................... G06Q 10/00 705/22 |
| 2010/0019905 A1 | 1/2010 | Boddie |
| 2010/0022221 A1 | 1/2010 | Yi |
| 2010/0046791 A1 | 2/2010 | Glickman |
| 2010/0205071 A1* | 8/2010 | Rangel ................. G06Q 10/087 705/28 |
| 2011/0010196 A1 | 1/2011 | Nee |
| 2012/0239493 A1 | 9/2012 | Zughaib |
| 2012/0262292 A1 | 10/2012 | Moser |
| 2012/0278205 A1* | 11/2012 | Chin .................... G06Q 10/087 705/28 |
| 2013/0144757 A1 | 6/2013 | Bauer |
| 2013/0218511 A1 | 8/2013 | Mager |
| 2014/0089248 A1 | 3/2014 | Lataille et al. |
| 2014/0351068 A1 | 11/2014 | Renfroe |

* cited by examiner

INVENTORY TRACKING

RELATED U.S. APPLICATION

This application is related to U.S. application Ser. No. 13/931,735, filed Jun. 28, 2013. The application is incorporated herein by reference for all purposes.

BACKGROUND

An inventory availability tracking system is typically an important component of a merchant site. As used in the present disclosure, the term "merchant site" may refer to an e-commerce site, an m-commerce site, a store kiosk, a social networking merchant front end, a customer service software application, or other types of sales operations. Generally, an inventory management system may include functionality to track current inventory levels of one or more products offered for sale at various levels of a merchant's sales structure. Such products may include products in a merchant's owned inventory, drop ship vendor inventory, liquidation marketplace inventory or other product inventories. Overselling or underselling are undesirable scenarios that could occur in cases where inventory availability tracking in a merchant database is unclear or unreliable.

Updating an item inventory at one or more front end servers on a real-time basis may be a resource-intensive process as it typically may involve: a complex backend algorithm to determine the accurate availability and delivery date of an item in a most optimal and expedited fashion; network delays (from the web/app server to back end systems and/or databases); additional access restrictions like authentication and authorization processes, protocol termination, acceleration, encryption, and decryption; and raw data access and additional processing.

Fast page creation and delivery to consumers may be important because as page load times increase, consumers may be increasingly more likely to abandon the page. Accordingly, slow page loading times on a merchant site may directly decrease overall sales and profitability.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
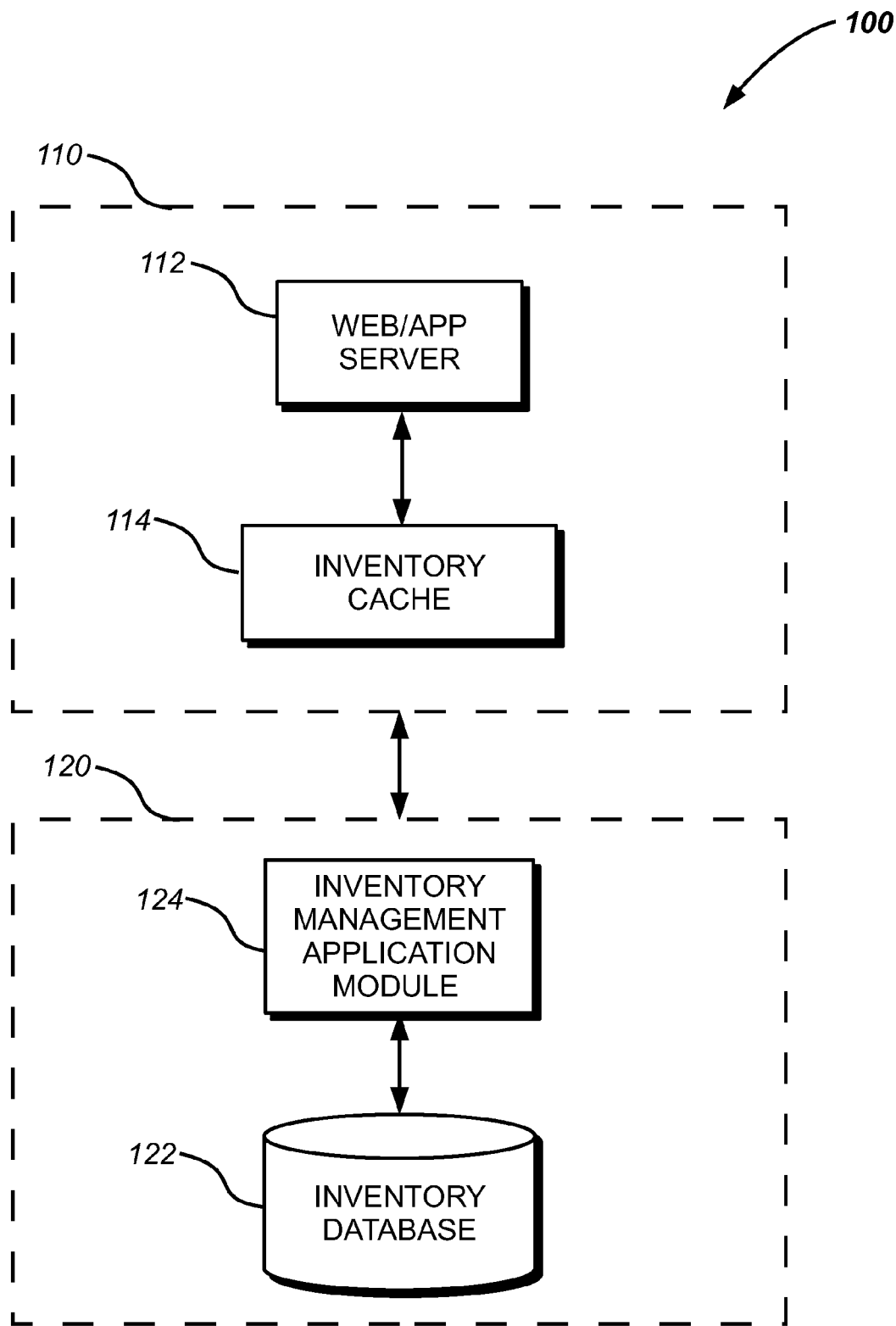
FIG. 1 is a block diagram illustrating components of an inventory cache management system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for updating and/or maintaining item inventory levels in an inventory cache and front end servers. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure are directed to updating item inventory levels in an inventory cache management system. According to embodiments disclosed herein, an item inventory availability status may be maintained in an inventory cache layer. Further, embodiments of the present disclosure include storing and tracking inventory in a database that can also act as a backup if the inventory cache layer is compromised. For example, in instances where the inventory cache layer is down or where there is otherwise a failed attempt to read a piece of data in the inventory cache layer, a front end server may make a data call to one or more inventory databases. Embodiments of the present system may mitigate delays associated with present item inventory systems by intelligently storing the inventory visibility in the inventory cache as will be described in detail. Additionally, embodiments of the present disclosure may enhance system reliability by utilizing inventory databases as a backup to the inventory cache layer.

As used in the present disclosure, an "item" may refer to a product that is offered for sale and/or sold by a merchant. Such products may include, but are not limited to: groceries, foods, office supplies, clothing wares, any other fungible goods sold by a retailer, commercial products, industrial goods, and the like. A merchant may typically operate and manage the systems disclosed and described herein or may enter into service agreements with a third party to operate and manage the systems.

Referring now to FIG. 1, embodiments of inventory cache management system 100 of the present disclosure comprises web/app server 112, inventory cache 114, inventory database 122, and inventory management application module 124. Inventory cache management system 100, web/app server 112, inventory cache 114, inventory database 122, and/or inventory management application module 124 may refer to one or more servers or other types of computing devices that operate in an individual or distributed manner as will be described in detail below. In embodiments, web/app server 112 and inventory cache 114 may be referred to as the front end 110 of system 100. In embodiments, inventory database 122 and inventory management application module 124 may be referred to as the inventory management system 120 of inventory cache management system 100.

In embodiments, web/app server 112 is adapted to transmit a graphical user interface to users. The graphical user interface may comprise an e-commerce webpage. In embodiments, the graphical user interface is embodied in a webpage that is encoded in a markup language such as HTML and may be transmitted to a user computing device for display to the user. In embodiments, the graphical user interface includes an item inventory status reflecting current stock levels of the item in the merchant's inventory. Web/app server 112 can query inventory cache 114 for a current inventory status for any particular item. The graphical user interface may be transmitted in a file via a communication network, such as the Internet, from web/app server 112 to the user computing device.

In embodiments, inventory cache 114 is adapted to receive and store the inventory status for one or more items. Typically, such items are offered for sale on the merchant's website via the graphical user interface provided by web/app server 112. Inventory cache 114 can periodically receive an item's inventory status from inventory database 122 via inventory management application module 124 as will be described in further detail. As inventory cache 114 receives each inventory status update from inventory management application module 124, the current inventory status update is stored within a memory unit of inventory cache 114. In embodiments, the memory unit of inventory cache 114 comprises any type of computer-readable media that provides a satisfactorily quick response to web/app server 112.

In embodiments, inventory database 122 is adapted to maintain an inventory quantity for one or more items. The inventory quantity may typically reflect an in-stock and available-to-ship inventory of each item offered for sale by merchant. Inventory database 122 is adapted to receive transaction updates from a transaction processing system in order to update inventory levels to reflect sales transactions.

In embodiments, inventory management application module 124 is adapted to monitor inventory levels stored at inventory database 122 for one or more items and compare the inventory levels to predetermined thresholds for the item. Following business rules that will be described in additional detail, inventory management application module 124 transmits alerts to inventory cache 114 to reflect actual inventory levels for each item.

In embodiments of the present disclosure, web/app server 112, inventory cache 114, inventory database 122, and inventory management application module 124 may transmit signals amongst each other via any type of communication network including, but not limited to, a wireless network, a cellular network, an intranet, the Internet, or combinations thereof.

In operation, inventory cache 114 maintains an item inventory availability status for each item. Inventory cache 114 can be refreshed regularly from data stored in inventory database 122 by inventory management application module 124 using a threshold-based triggering mechanism. Thresholds may be created by the merchant to direct how often inventory cache 114 is updated with inventory data from inventory database 122. In one example embodiment of the present disclosure, an item inventory status relative to either a "high" inventory threshold or a "medium" inventory threshold may be conveyed to inventory cache 114 from inventory database 122. For example, for a particular item, a high threshold may be set at 40 items and a medium threshold may be set at 20 items. While the inventory level of that item, as maintained in inventory database 122, remains at or above the high threshold, inventory cache 114 stores and reports that the item is "in-stock." As sales transactions are completed, the inventory level of the item may be updated at inventory database 122 to reflect the actual in-stock quantity of the item. However, in embodiments, an inventory status signal is not transmitted from inventory database 122 to inventory cache 114 for each transaction while the inventory level remains at or above the high threshold. If the inventory level of the item, as recorded and maintained in inventory database 122, drops below the high threshold, inventory management application module 124 can transmit a signal to inventory cache 114 to update the new inventory status at inventory cache 114 accordingly. Such a signal may be referred to herein as a "Limited Stock Alert." A Limited Stock Alert may include an item identification code and the updated inventory quantity of the item. In embodiments, a Limited Stock Alert is transmitted by inventory management application module 124 to inventory cache 114 for every supply and demand change in inventory database 122 while the inventory level remains below the high threshold. For example, a Limited Stock Alert may be triggered by each sale of an item having an inventory level below the high threshold.

For example, upon completion of each sale transaction subsequent to a breach of the high threshold, inventory management application module 124 can transmit a Limited Stock Alert to inventory cache 114 containing the updated inventory quantity of the relevant item. In alternative embodiments, inventory management application module 124 can transmit a Limited Stock Alert to inventory cache 114 on a periodic repeating basis after the high threshold was breached. In embodiments, inventory management application module 124 may be selectively configured to transmit Limited Stock Alerts at predetermined intervals, upon certain conditions such as every transaction completion, completion of a set number of transactions, or upon satisfaction of other circumstances.

In embodiments, while the inventory level of an item, as maintained in inventory database 122, remains below the high threshold but above the medium threshold, inventory cache 114 stores and reports that the item is "limited." As sales transactions are completed, the inventory level of the item may be updated at inventory database 122 to reflect the actual in-stock quantity of the item. While the inventory status of the item remains limited, an inventory status signal may be transmitted from inventory database 122 to inventory cache 114 upon each transaction completion while the inventory level remains below the high threshold. If the inventory level of the item, as recorded and maintained in inventory database 122, drops below the medium threshold, inventory management application module 124 can transmit a signal to inventory cache 114 to update the new inventory status at inventory cache 114 accordingly. Such a signal may be referred to herein as an "Out of Stock Alert." An Out of Stock Alert may include an item identification code and the updated inventory quantity of the item. In embodiments, an Out of Stock Alert is transmitted by inventory management application module 124 to inventory cache 114 for every supply and demand change in inventory database 122 while the inventory level remains below the medium threshold. Alternatively, an Out of Stock Alert may be transmitted at predetermined times or upon meeting certain criteria, such as specific inventory levels at inventory database 122. A medium threshold may be selectively established to provide a safety stock level to act as a cushion and safeguard against backorders and possible order cancellation.

In operation, web/app server 112 can query inventory cache 114 for an item inventory status and produce an item inventory status for display at a user computing device. Web/app server 112 may query inventory cache 114 and produce an item e-commerce page in response to a user shopping action. For example, a user may request to see details of an item on an e-commerce website, mobile application, or other commerce platform. Web/app server 112 is adapted to transmit, to the user's computing device, information related to the item. Such information may include a current inventory status of the item. In embodiments of the present disclosure, if the inventory level of the item is at or above the high threshold, web/app server 112 may report the item inventory status as "available" to the user. If the inventory status level is below the high threshold but at or above the medium threshold, web/app server 112 may report the item inventory status as "limited" to the user. If the inventory status level is below the medium threshold, web/app server 112 may report the item inventory status as "out of stock" to the user.

Figure 2:
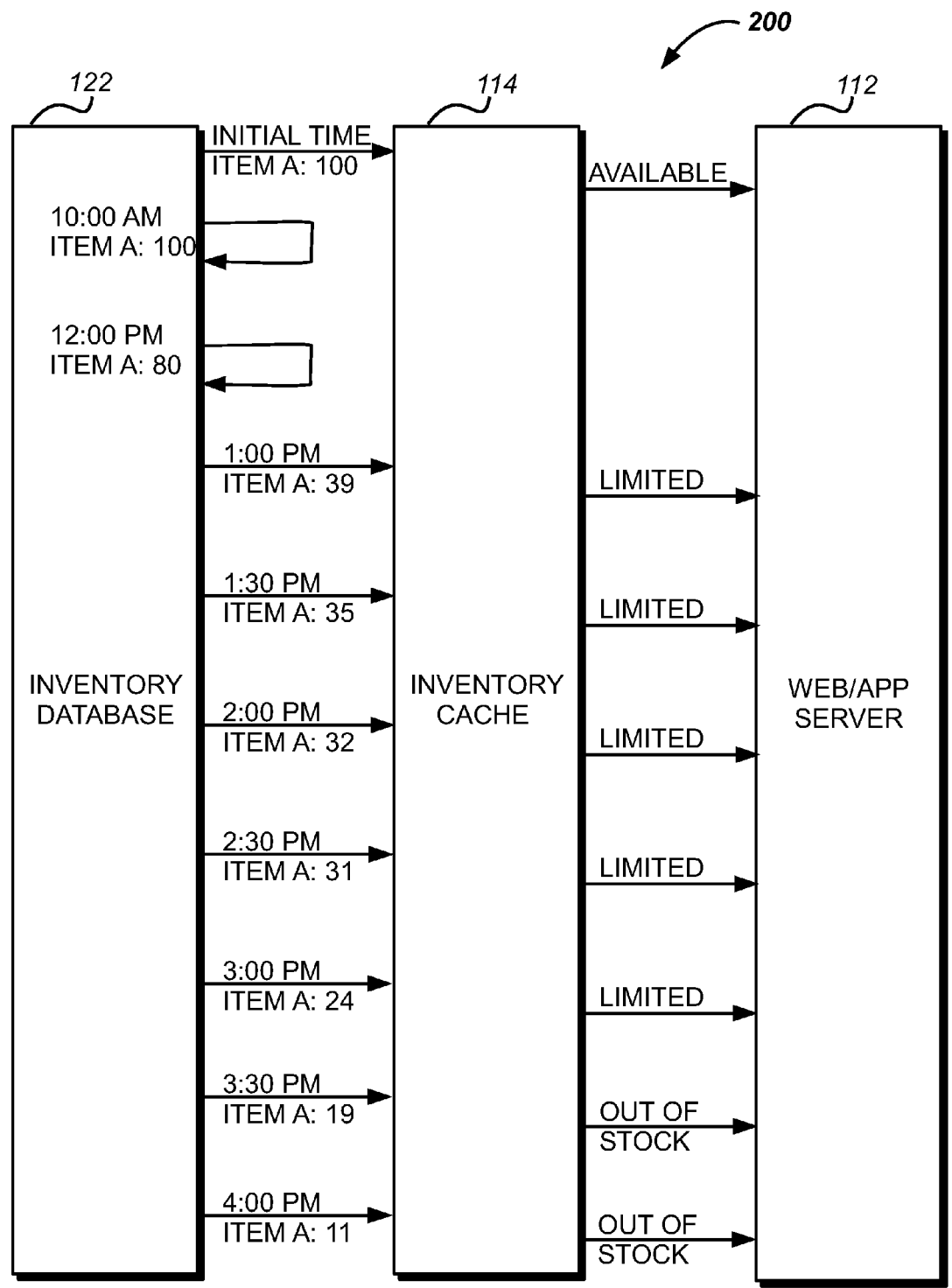
FIG. 2 is a chart illustrating an example method for updating an inventory cache management system in accordance with embodiments of the present disclosure.

Referring now to FIG. 2, an example application 200 of the foregoing operations is depicted. FIG. 2 illustrates a series of signal transmissions from inventory management application module 124 to inventory cache 114 and from inventory cache 114 to web/app server 112 according to embodiments of the present disclosure. Such signal transmissions may relate to inventory levels of an item referred to as "Item A" in FIG. 2. As FIG. 2 illustrates, inventory management application module 124 initially reports to inventory cache 114 an inventory quantity of 100 for Item A. Accordingly, inventory cache 114 reports an inventory status for Item A of "available" to web/app server 112. Subsequent sales may cause inventory database 122 to reduce the inventory level of Item A from 100 (at 10:00 AM) to 80 (at 12:00 PM). However, because the inventory level remains above the high threshold of 40, additional inventory level signals are not transmitted to inventory cache 114. Withholding such inventory level signals may reduce network traffic between inventory management application module 124 and inventory cache 114 while still maintaining adequately accurate inventory information closer to the web/app server 112 for quicker access. While inventory cache 114 receives no further inventory level signals, inventory cache 114 continues to report an inventory status of "available" to web/app server 112.

After the high threshold has been breached, inventory management application module 124 transmits a Limited Stock Alert to inventory cache 114, reflecting that the inventory level of Item A is now below the high threshold for that item. In the example depicted in FIG. 2, the first Limited Stock Alert is transmitted at 1:00 PM and indicates the actual current inventory level of Item A. At 30 minute intervals following the first Limited Stock Alert transmission, inventory management application module 124 transmits additional Limited Stock Alerts that reflect updated inventory levels of Item A as sales continue. Such Limited Stock Alerts are made at 1:30 PM, 2:00 PM, 2:30 PM, and 3:00 PM. In alternative embodiments, Limited Stock Alerts are transmitted by inventory management application module 124 upon each transaction completion. In other embodiments, Limited Stock Alerts are transmitted by inventory management application module 124 at other time periods. As inventory cache 114 receives Limited Stock Alerts, the updated inventory status of Item A is made available to web/app server 112 to display the "limited" inventory status to users.

Upon the inventory level breaching the medium threshold of 20 items, an Out of Stock Alert is transmitted by inventory management application module 124 to inventory cache 114 at 3:30 PM. The Out of Stock Alert includes the current inventory level of Item A. An additional Out of Stock Alert is transmitted by inventory management application module 124 to inventory cache 114 at 4:00 PM. Inventory cache 114 makes the updated inventory status of "out of stock" for Item A available to web/app server 112. In embodiments, web/app server 112 may cease sales activity of an item that has been reported out of stock until the inventory has been replenished above the medium threshold.

In embodiments, the high and medium thresholds of any particular item may be selected based on current factors such as total beginning inventory, expected transaction rate, expected computer network congestion and/or system latency, and other relevant factors.

In alternative embodiments, inventory management system 120 can determine future availability of inventory by tracking items that are out of stock or in limited availability, but that will become available in the relatively near future. For example, inventory at a warehouse dock waiting to be received into the warehouse or inventory in transit may be referred to as future inventory. In such embodiments, system 100 may allow an order to be placed against the future inventory, thereby reducing sales lost due to backordered items.

As will be understood by one of ordinary skill in the art having the benefit of this disclosure, inventory cache management system 100 may present advantages over current common practices. For example, by selectively setting the high and medium thresholds for any particular item to meet specific circumstances, inventory cache management system 100 may avoid displaying incorrect availability information at the graphical user interface. Accurate availability information may lower the chance for overselling or underselling an item. Accurate availability information may also reduce order cancellations due to backordered items. Because inventory cache management system 100 may reduce activity and network communications while items are above their high thresholds, and because an inventory status is maintained at the front end 110, additional advantages of system 100 may include faster response times for availability inquiries, reduced network delay between inventory cache 114 and web/app server 112 during availability requests, and lower CPU utilization. Generally, faster page loads may have a significant effect on sales and/or conversion rates.

Figure 3:
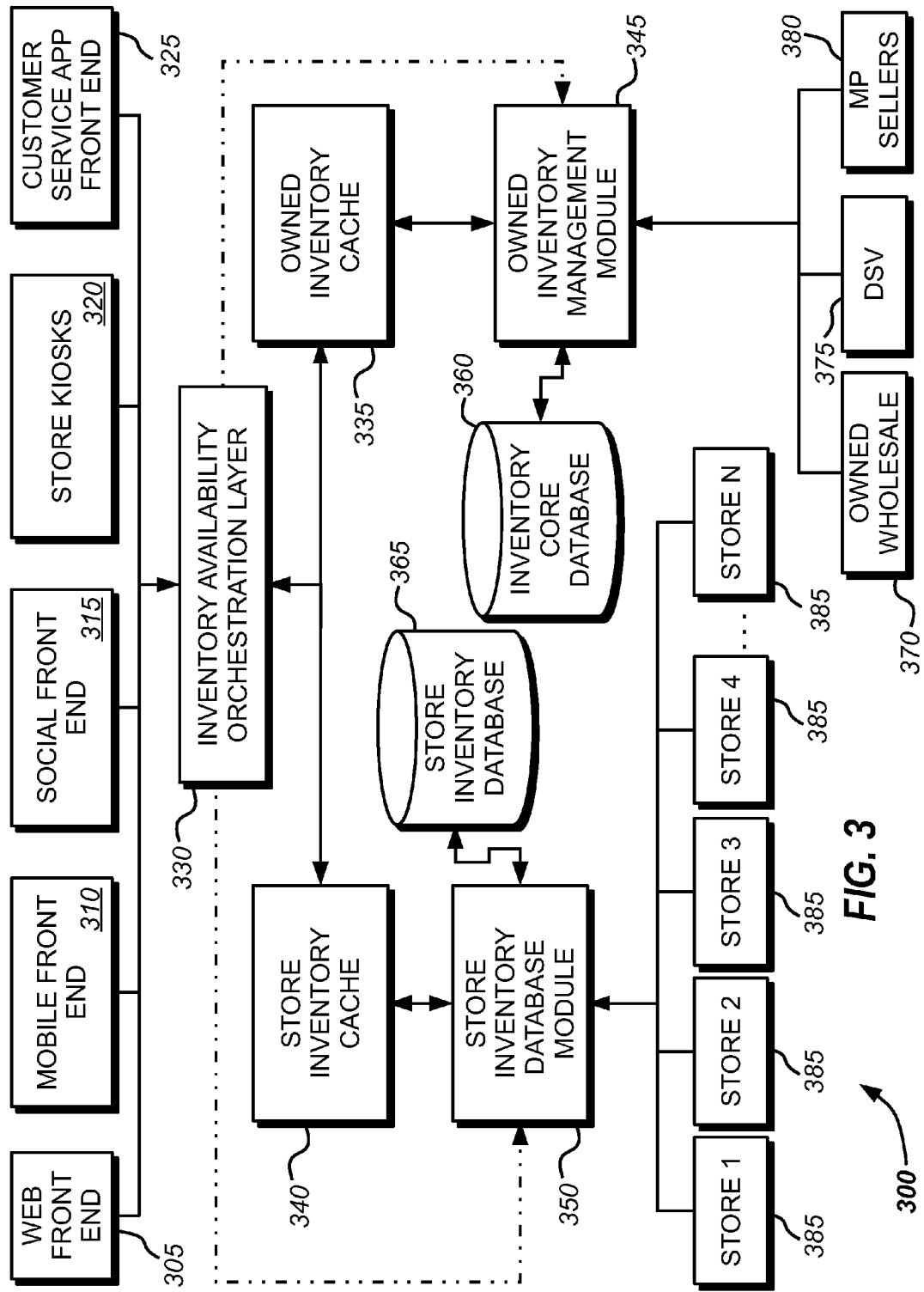
FIG. 3 is a block diagram illustrating an inventory cache management system according to another embodiment of the present disclosure.

Referring now to FIG. 3, an embodiment of inventory cache management system 300 is illustrated. In embodiments, web/app servers 112 of an embodiment of inventory cache management system 300 comprises web front end 305, mobile front end 310, social front end 315, store kiosks 320, and customer service application front end 325. In embodiments, inventory cache 114 comprises inventory availability orchestration layer 330, owned inventory cache 335, and store inventory cache 340. In embodiments, inventory management application module 124 comprises owned inventory management module 345 and store inventory database module 350. In embodiments, inventory database 122 comprises inventory core database 360, store inventory database 365, owned wholesale database 370, drop ship vendor inventory database 375, marketplace sellers database 380 and individual store databases 385.

In operation, owned inventory management module 345 can maintain an inventory quantity for items held in inventory core database 360, owned wholesale database 370, drop ship vendor inventory database 375, and marketplace sellers database 380. The store inventory database module 350 can maintain an inventory quantity for items at each retail location of stores 385. In an embodiment, store databases 385 may transmit data as transactions occur. Such transmissions may be carried out via the Internet or other communication network. In an embodiment, data are transmitted from store databases 385 to store inventory database module 350 using the file transfer protocol (FTP). In alternative embodiments, data may be transmitted using other protocols or means. Store inventory database 365 can host inventory supply information from store databases 385. In embodiments, store inventory database 365 stores aggregated inventory data from stores 385. Store inventory database 365 may be embodied in a Cassandra database. Alternatively, other distributed or central database systems, or combinations thereof, may be used to host inventory data.

Owned inventory cache 335 can receive updated inventory status and item demand data from owned inventory management module 345. In embodiments, such updated information may be provided on a push basis as changes to inventory levels occur, or according to other methods as described herein. Store inventory cache 340 can receive updated inventory status from store inventory database module 350.

Inventory availability orchestration layer 330 can request inventory levels from owned inventory cache 335 and store inventory cache 340 as requests are received from web front end 305, mobile front end 310, social front end 315, store kiosks 320, or customer service application front end 325. As owned inventory cache 335 and/or store inventory cache 340 transmit responses to such requests back to inventory availability orchestration layer 330, inventory availability orchestration layer 330, can aggregate such responses and compute item availability. In embodiments, a response to a request from inventory availability orchestration layer 330 may be transmitted directly from owned inventory management module 345 to inventory availability orchestration layer 330.

In embodiments, a backup strategy may be implemented for cases where there has been a failed attempt to read a piece of data in the inventory cache layer 114 in response to a request from a server 112 or other type of cache miss. In such cases, inventory availability orchestration layer 330 can request inventory levels directly from owned inventory management module 345 and/or store inventory database module 350, thereby bypassing inventory caches 335, 340.

In operation, inventory availability orchestration layer 330 may receive a request from one of front end systems 305, 310, 315, 320, 325. Embodiments of inventory availability orchestration layer 330 can determine if the request is for data related to owned inventory, store inventory, or both. Such a determination may be made according to the nature of the item and/or the source of the request. Inventory availability orchestration layer 330 can then call the corresponding cache (i.e., owned inventory cache for owned inventory, store inventory cache for store inventory, or both caches). If one or more caches 335, 340 fail to respond to the call, inventory availability orchestration layer 330 can call the appropriate inventory module 345, 350 as described above. After receiving the requested data, inventory availability orchestration layer 330 can transmit a response to the front end system 305, 310, 315, 320, or 325 that requested the data. While cache misses continue to occur and/or a cache 335, 340 is down, inventory availability orchestration layer 330 can store the inventory information for future use.

Figure 4:
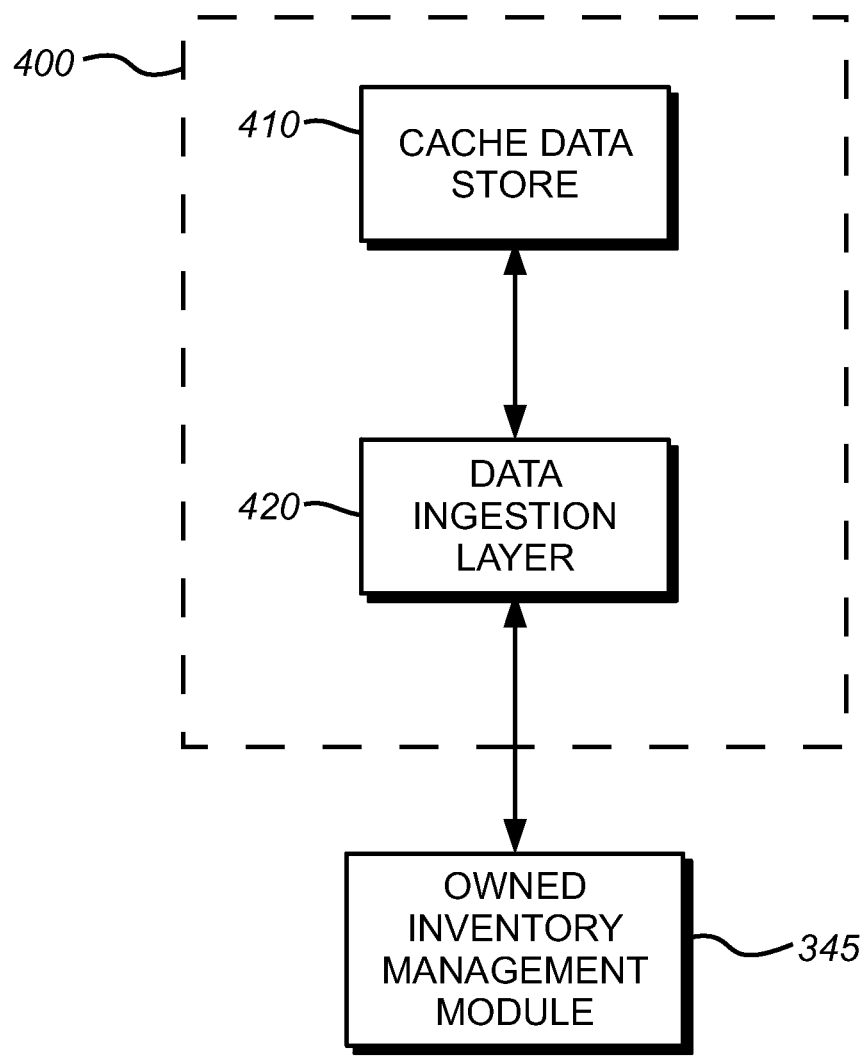
FIG. 4 is a block diagram illustrating an inventory cache having a data ingestion layer according to embodiments of the present disclosure.

Referring now to FIG. 4, an embodiment of owned inventory cache 400 is depicted. As described above, owned inventory cache 400 comprises inventory cache storage for owned inventory, drop ship vendor inventory, and marketplace inventory. In embodiments, owned inventory cache 400 can be updated by data pushes from owned inventory management module 345. Owned inventory cache 400 comprises cache data store 410 and data ingestion layer 420. Data ingestion layer 420 can receive inventory data received from owned inventory management module 345, process and validate the received data, and incorporate the validated data into cache data store 410. Data ingestion layer 420 is adapted to reduce dependency of owned inventory cache 400 on owned inventory management module 345 and therefore diminish coupling between owned inventory cache 400 and owned inventory management module 345.

In embodiments, owned inventory management module 345 is adapted to host inventory supply and demand and computes item availability. Owned inventory management module 345 can push availability messages into owned inventory cache 400 via data ingestion layer 420. Embodiments of data ingestion layer 420 can identify and handle out-of-sequence updates from owned inventory management module 345 to increase accuracy of owned inventory cache 400.

Figure 5:
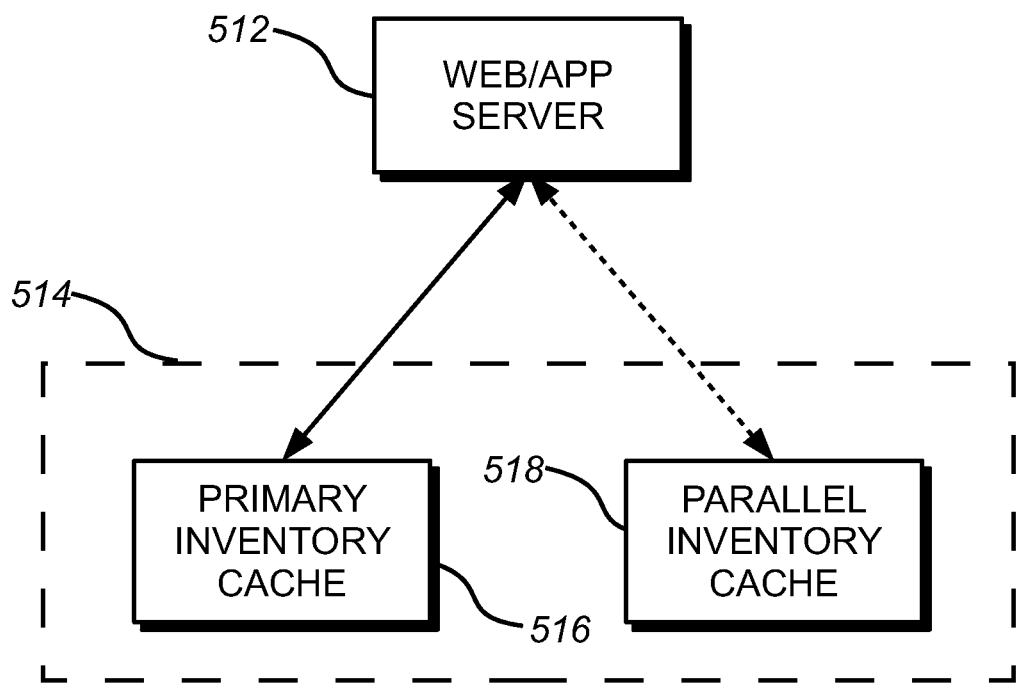
FIG. 5 is a block diagram illustrating an inventory cache having a primary inventory cache and a parallel inventory cache according to embodiments of the present disclosure.

Referring now to FIG. 5, embodiments of the present disclosure comprise one or more web/app servers 512 and inventory cache 514 as disclosed above. As depicted in FIG. 5, inventory cache 514 may represent embodiments of owned inventory cache 335 and store inventory cache 340. inventory cache 514 comprises primary inventory cache 516 and parallel inventory cache 518. Embodiments of primary inventory cache 516 are adapted to function in the manners described above. Embodiments of parallel inventory cache 518 are adapted to reflect inventory levels that are different or in addition to the inventory levels stored at primary inventory cache 516. Parallel inventory cache 518 may receive inventory data messages from database modules 345 or 350 and additionally receive inventory data that are related to specific circumstance, for example holiday inventory items that are only carried in stock at a specific time of year or other limited and/or peaks types of items.

In operation, parallel inventory cache 518 can be put into use during holidays or other peak selling season. It may be desirable for operators of inventory cache management system to only display inventory availability for certain products related to the holiday or other peak period after a certain time. For example, items related to the Christmas holiday may be offered for sale only beginning after Thanksgiving, and it may be undesirable for inventory availability of such items to be displayed to potential customers before Thanksgiving. Parallel inventory cache 518 may be populated with inventory status data from inventory management system 120 databases and may be additionally populated with inventory data related to special inventory that will be sold in connection with the holiday or other period. Such special inventory may comprise additional stock of the same items already for sale, new items introduced for the holiday or other period, themed items relating specifically to a holiday period, and/or items available in limited stock. The special inventory data may also include discounted prices to be offered in connection with the holiday or other period.

Before the appointed time to display availability of the special inventory, web/app servers 512 can reflect inventory status data from primary inventory cache. During that time, parallel inventory cache 518 can be populated with data from primary inventory cache 516 and/or from item databases, including special inventory to be offered after the appointed time. At that appointed time, web/app servers 512 may be instructed to begin requesting inventory status from parallel inventory cache 518 instead of primary inventory cache 516. Web/app servers 512 may continue to do so until a predetermined end time of the holiday or peak period, or until further instructions are transmitted to revert back to primary inventory cache 516. During the holiday or peak period, primary inventory cache 516 may be kept populated and updated with normal inventory status data, such that web/app servers 512 can quickly revert back.

In another embodiment, certain items stored in cache 514 are assigned a start data and/or start time. Web/app servers 512 and/or inventory availability orchestration layer 330 are adapted to not display data for special inventory, for which the assigned start date/time have not yet passed. In other embodiments, items may additionally be assigned an end date/time, after which point the special data will not be displayed to potential customers. As an example of the foregoing, a certain item may have a price discount for an upcoming holiday season. The price discount may be entered into the parallel inventory cache 518 (or the primary inventory cache 516 and associated with a start date/time) via an item database. At the appointed holiday time, the lower price will begin to be displayed to potential customers and sales may be carried out at that price.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of updating an inventory cache management system, comprising:
providing an e-commerce web site over an internet from a front end server to a user computing device, the e-commerce website comprising an inventory status indicator;
at a backend inventory management module, receiving a first item inventory level quantity located at one or more warehouse locations;
storing the first item inventory level quantity at an inventory core database;
at a store inventory database module, receiving and storing a second item inventory level quantity located at a retail store location different from the one or more warehouse locations;
at the backend inventory management module, comparing the first item inventory level quantity with a first item high threshold;
if the first item inventory level quantity is less than the first item high threshold, transmitting a first Limited Stock Alert from the backend inventory management module to a backend inventory cache;

at the backend inventory cache, storing a first inventory status corresponding to the first item inventory level quantity;

at the store inventory database module, comparing the second item inventory level quantity with a second item high threshold;

if the second item inventory level quantity is less than the second item high threshold, transmitting a second Limited Stock Alert from the store inventory database module to a store inventory cache;

at the store inventory cache, storing a second inventory status corresponding to the second item inventory level quantity;

at the front end server, receiving a data request for an item from the user computing device;

at an inventory availability orchestration layer, receiving the data request for the item from the front end server;

at the inventory availability orchestration layer, determining if the data request for the item is for data related to at least one of the first inventory status stored at the backend inventory cache or to at least one of the second inventory status stored at the store inventory cache;

at the inventory availability orchestration layer, calling the backend inventory cache or the store inventory cache for the data according to the data request;

at the inventory availability orchestration layer, receiving each response from the backend inventory cache and the store inventory cache to be combined into an aggregated inventory status;

transmitting the data related to the aggregated inventory status to the front end server for display at the e-commerce website on the user computing device as the inventory status indicator in response to the data request from the user computing device, wherein:
  the inventory status indicator allows a user to purchase the item from a store inventory or a warehouse inventory; or
  if the item is not available for purchase from the store inventory or the warehouse inventory, the inventory status indicator allows the user to place a backorder for the item based on a future inventory availability of the item in the store inventory or the warehouse inventory; and at the inventory availability orchestration layer, requesting the second item inventory level quantity from the store inventory database module and the backend inventory management module and bypassing the store inventory cache and the backend inventory cache when transmitting the data related to the aggregated inventory status to the front end server fails.

2. The method of claim 1, further comprising:
from the front end server, transmitting the first inventory status for display at the e-commerce website on the user computing device.

3. The method of claim 1, further comprising:
transmitting the first item inventory level quantity to the backend inventory cache.

4. The method of claim 1, further comprising:
transmitting the second item inventory level quantity to the store inventory cache.

5. The method of claim 1, further comprising:
at the backend inventory management module, comparing the first item inventory level quantity with a medium threshold; and if the first item inventory level quantity is less than the medium threshold, transmitting an Out of Stock Alert from the backend inventory management module to the backend inventory cache.

6. The method of claim 1, further comprising:
at the store inventory database module, comparing the second item inventory level quantity with a medium threshold; and if the second item inventory level quantity is less than the medium threshold, transmitting an Out of Stock Alert from the store inventory database module to the store inventory cache.

7. The method of claim 1, further comprising:
transmitting a request from the inventory availability orchestration layer to one of the backend inventory management module or the store inventory database module; and at the inventory availability orchestration layer, receiving one of the first item inventory level quantity or the second item inventory level quantity in response to the request.

8. The method of claim 1, wherein:
the second item inventory level quantity is different than the first item inventory level quantity; and the second item inventory level quantity comprises a quantity of an item available only after a selected starting date.

9. The method of claim 8, further comprising:
receiving the selected starting date; and
after receiving the selected starting date, transmitting the second inventory status to the front end server for display at the e-commerce website as a second inventory status indicator.

10. The method of claim 1, further comprising:
the second item inventory level quantity is different than the first item inventory level quantity;

the second item inventory level quantity comprises a quantity of an item available only after a selected starting date;

receiving the selected starting date;

after receiving the selected starting date, transmitting the second inventory status to the front end server for display at the e-commerce website as a second inventory status indicator;

from the front end server, transmitting the second inventory status for display at the user computing device;

transmitting the first item inventory level quantity to the backend inventory cache;

transmitting the second item inventory level quantity to the store inventory cache;

at the backend inventory management module, comparing the first item inventory level quantity with a medium threshold;

if the first item inventory level quantity is less than the medium threshold of the first item inventory level quantity, transmitting an Out of Stock Alert from the backend inventory management module to the backend inventory cache;

at the store inventory database module, comparing the second item inventory level quantity with a medium threshold;

if the second item inventory level quantity is less than the medium threshold of the second item inventory level quantity, transmitting an Out of Stock Alert from the store inventory database module to the store inventory cache;

transmitting a request from the inventory availability orchestration layer to one of the backend inventory management module or the store inventory database module; and at the inventory availability orchestration layer, receiving one of the first item inventory level quantity or the second item inventory level quantity in response to the request.

11. The method of claim 5, further comprising:

after transmitting the Out of Stock alert from the backend inventory management module to the backend inventory cache, ceasing sales activities of a first item associated with a first item inventory level quantity unit, the first item inventory level quantity is above the medium threshold.

12. A computer-implemented method of maintaining a store item inventory system comprising:

providing an e-commerce web site over an internet from a front end server to a user computing device, the e-commerce website comprising an inventory status indicator;

at a store inventory database module, setting a high threshold for a store inventory item;

at the store inventory database module, receiving a transaction confirmation completion;

at a store inventory database, updating an item inventory level located at a retail store location;

at the store inventory database module, comparing the item inventory level to the high threshold;

if the item inventory level is equal to or less than the high threshold, transmitting a first Limited Stock Alert from the store inventory database module to a store inventory cache;

at the store inventory cache, storing an item inventory status corresponding to the item inventory level located at the retail store location;

at the front end server, receiving a data request for an item from the user computing device;

at an inventory availability orchestration layer, receiving a backend inventory cache or the store inventory cache for data according to the data request;

at the inventory availability orchestration layer, transmitting each response of the backend inventory cache and the store inventory cache to be combined into an aggregated inventory status;

coordinate presenting the aggregated inventory status to the front end server for display at the e-commerce website at the user computing device as the inventory status indicator in response to the data request from the user computing device, wherein the inventory status indicator allows a user to purchase the item from a store inventory or place a backorder for the item based on a future inventory availability of the item in the store inventory; and at the inventory availability orchestration layer, requesting the item inventory level from the store inventory database module and a backend inventory management module and bypassing the store inventory cache and the backend inventory cache when coordinating presenting the item inventory status of the data related to the aggregated inventory status to the front end server fails.

13. The method of claim 12, wherein:

transmitting the first Limited Stock Alert from the store inventory database module to the store inventory cache comprises:

transmitting the item inventory level to the store inventory cache.

14. The method of claim 12, further comprising:

at the store inventory database module, comparing the item inventory level with a predetermined medium threshold; and if the item inventory level is less than the predetermined medium threshold, transmitting an Out of Stock Alert from the store inventory database module to the store inventory cache.

15. The method of claim 12, further comprising:

at the store inventory database module, receiving and storing a second item inventory level;

at the store inventory database module, comparing the second item inventory level with a second item high threshold;

if the second item inventory level is less than the second item high threshold, transmitting a second Limited Stock Alert from the store inventory database module to the store inventory cache; and at the store inventory cache, storing a second inventory status corresponding to the second item inventory level at the retail store location.

16. The method of claim 12, wherein:

the second item inventory level is different than the first item inventory level; and the second item inventory level comprises a quantity of an item available only after a selected starting date.

17. The method of claim 16, further comprising:

receiving the selected starting date; and after receiving the selected starting date, transmitting the second inventory status to the front end server for display at the e-commerce website as a second inventory status indicator.

18. The method of claim 12, further comprising:

at the store inventory database module, receiving and storing a second item inventory level;

at the store inventory database module, comparing the second item inventory level with a second item high threshold;

if the second item inventory level is less than the second item high threshold, transmitting a second Limited Stock Alert from the store inventory database module to the store inventory cache;

at the store inventory cache, storing a second inventory status corresponding to the second item inventory level, wherein the second item inventory level is different than the first item inventory level and the second item inventory level comprises a quantity of an item available only after a selected starting date;

receiving the selected starting date;

after receiving the selected starting date, transmitting the second inventory status to the front end server for display at the e-commerce website as a second inventory status indicator;

wherein transmitting the first Limited Stock Alert from the store inventory database module to the store inventory cache comprises transmitting the first item inventory level to the store inventory cache;

at the store inventory database module, comparing the item inventory level with a predetermined medium threshold; and if the first item inventory level is less than the predetermined medium threshold, transmitting an Out of Stock Alert from the store inventory database module to the store inventory cache.

19. The method of claim 14, further comprising:

after transmitting the Out of Stock alert from the backend inventory management module to the backend inventory cache, ceasing sales activities of an item associated with an item inventory level unit, the item inventory level is above the predetermined medium threshold.

20. A computer implemented inventory cache management system comprising:
an inventory cache, further comprising:
a backend inventory cache and a backend inventory management module located at one or more warehouse locations;
a store inventory cache and a store inventory database module located at a retail location different from the one or more warehouse locations; and
a data ingestion layer;
an inventory core database, adapted to store a first item inventory level quantity;
an inventory management application module;
one or more processors; and
memory storing one or more programs to be executed by the one or more processors, the one or more programs comprising instructions for:
at the backend inventory management module, receiving the first item inventory level quantity located at the one or more warehouse locations;
storing the first item inventory level quantity at the inventory core database;
at the store inventory database module, receiving and storing a second item inventory level quantity located at a retail store location different from the one or more warehouse locations;
at the backend inventory management module, comparing the first item inventory level quantity to a predetermined first item high threshold;
if the first item inventory level quantity is less than the predetermined first item high threshold, transmitting a first Limited Stock Alert to the backend inventory cache;
at the backend inventory cache, storing a first inventory status corresponding to the first item inventory level quantity;
at the store inventory database module, comparing the second item inventory level quantity with a second item high threshold;
if the second item inventory level quantity is less than the second item high threshold, transmitting a second Limited Stock Alert from the store inventory database module to the store inventory cache;
at the store inventory cache, storing a second inventory status corresponding to the second item inventory level quantity;
request the first item inventory level quantity from the inventory core database when transmitting the first Limited Stock Alert fails;
at a front end server, receiving a data request for an item from a user computing device;
at an inventory availability orchestration layer, receiving the data request for the item from the front end server;
transmit an inventory status indicator to an e-commerce website provided to the user computing device at the front end server in response to the data request for the item from the user computing device from the front end server;
at the inventory availability orchestration layer, determining if the data request for the item is data related to at least one of the first inventory status stored at the backend inventory cache or to at least one of the second inventory status stored at the store inventory cache;
at the inventory availability orchestration layer, calling the backend inventory cache or the store inventory cache for the data according to the data request;
at the inventory availability orchestration layer, receiving each response of the backend inventory cache and the store inventory cache to be combined into an aggregated inventory status;
transmitting the data related to the aggregated inventory status to the front end server for display at the e-commerce website on the user computing device as the inventory status indicator in response to the data request from the user computing device, wherein:
the inventory status indicator allows a user to purchase the item from a store inventory or a warehouse inventory; or,
if the item is not available for purchase from the store inventory or the warehouse inventory, place a backorder for the item based on a future inventory availability of the item in the store inventory or the warehouse inventory; and
at the inventory availability orchestration layer, requesting the second item inventory level quantity from the store inventory database module and the backend inventory management module and bypassing the store inventory cache and the backend inventory cache when transmitting the data related to the aggregated inventory status to the front end server fails.

21. The inventory cache management system of claim 20, wherein:
the inventory core database is further adapted to store the second item inventory level quantity, wherein the second item inventory level quantity is different than the first item inventory level quantity and the second item inventory level quantity comprises a quantity of an item available only after a selected starting date; and
the inventory management application module is adapted to:
compare the second item inventory level quantity with a second item high threshold; and
if the second item inventory level quantity is less than the second item high threshold, transmitting a second Limited Stock Alert to the store inventory cache.

22. The inventory cache management system of claim 21, wherein:
the inventory management application module is further adapted to:
receive the selected starting date; and
after receiving the selected starting date, transmit the second inventory status to the front end server for display at the e-commerce website as a second inventory status indicator.

23. The inventory cache management system of claim 20, wherein:
the inventory management application module is adapted to:
compare the first item inventory level quantity with a medium threshold;
if the first item inventory level quantity is less than the medium threshold, transmit an Out of Stock Alert to the backend inventory cache; and
after transmitting the Out of Stock alert to the backend inventory cache, cease sales activities of an item associated with a first item inventory level quantity unit, the first item inventory level quantity is above the medium threshold.

\* \* \* \* \*